United States Patent
Han et al.

(10) Patent No.: US 9,173,122 B2
(45) Date of Patent: Oct. 27, 2015

(54) METHOD, TERMINAL AND NETWORK DEVICE FOR CONFIGURING MEASUREMENT GAP

(71) Applicant: Huawei Technologies Co., Ltd., Shenzhen, Guangdong (CN)

(72) Inventors: Guanglin Han, Shenzhen (CN); Weiwei Song, Shenzhen (CN); Wei Quan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 267 days.

(21) Appl. No.: 13/853,264

(22) Filed: Mar. 29, 2013

(65) Prior Publication Data

US 2013/0215736 A1 Aug. 22, 2013

Related U.S. Application Data

(63) Continuation of application No. PCT/CN2011/075045, filed on May 31, 2011.

(30) Foreign Application Priority Data

Sep. 30, 2010 (CN) .......................... 2010 1 0512013

(51) Int. Cl.
   *H04W 24/10* (2009.01)
   *H04L 5/00* (2006.01)
   *H04W 24/04* (2009.01)

(52) U.S. Cl.
   CPC ............... *H04W 24/10* (2013.01); *H04L 5/001* (2013.01); *H04L 5/0091* (2013.01); *H04W 24/04* (2013.01)

(58) Field of Classification Search
   CPC .................................................... H04W 24/00
   See application file for complete search history.

(56) References Cited

U.S. PATENT DOCUMENTS

| 2009/0180447 A1* | 7/2009 | Kim et al. ...................... 370/338 |
| 2010/0197298 A1* | 8/2010 | So et al. ......................... 455/424 |

(Continued)

FOREIGN PATENT DOCUMENTS

| CN | 101043708 A | 9/2007 |
| CN | 101674586 A | 3/2010 |

(Continued)

OTHER PUBLICATIONS

International Search Report in corresponding International Patent Application No. PCT/CN2011/075045 (Sep. 8, 2011).

(Continued)

*Primary Examiner* — Andrew Lai
*Assistant Examiner* — Sumitra Ganguly
(74) *Attorney, Agent, or Firm* — Leydig, Voit & Mayer, Ltd.

(57) ABSTRACT

The present invention provides a method for configuring measurement gap, terminal and network device. The method includes: determining an aggregation state of current component carriers, an aggregation state of component carriers which will be configured for a terminal by a network side, or a failure state of a measurement performed by a terminal according to a state of a current measurement configuration; sending, in the case of the aggregation state of the current component carriers or the failure state of the measurement, current measurement capability information of the terminal to the network side; sending, in the case of the aggregation state of the component carriers which will be configured for the terminal by the network side, measurement capability information according to the aggregation state of the component carriers which will be configured for the terminal. The embodiments of the present invention may reduce signaling overhead and avoid signaling waste.

20 Claims, 9 Drawing Sheets

(56) References Cited

U.S. PATENT DOCUMENTS

2010/0284360 A1* 11/2010 Dalsgaard et al. ............ 370/329
2011/0081868 A1* 4/2011 Kim et al. .................. 455/67.11
2011/0274007 A1* 11/2011 Lin et al. ....................... 370/254

FOREIGN PATENT DOCUMENTS

CN 101784075 A 7/2010
CN 101873646 A 10/2010

OTHER PUBLICATIONS

Written Opinion of the International Search Report in corresponding International Patent Application No. PCT/CN2011/075045 (Sep. 8, 2011).
Extended European Search Report in corresponding European Patent Application No. 11789221.6 (Sep. 4, 2013).
"R4-101725—Draft Reply LS on UE RF Model and Capability," 3GPP TSG-RAN WG4 Meeting #55, May 10-14, 2010, 3GPP, Valbonne, France.
"R4-102658—Discussion on Mobility Evaluations for Carrier Aggregation," 3GPP TSG-RAN WG4 AD Hoc Meeting #10-03, Jun. 28-Jul. 2, 2010, 3GPP, Valbonne, France.
"TS 36.300—3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," Jun. 2010, V10.0.0, 3GPP, Valbonne, France.
"TS 36.331—3rd Generation Partnership Project; Technical Specification Group Radio Access Network; Evolved Universal Terrestrial Radio Access (E-UTRA); Radio Resource Control (RRC); Protocol specification (Release 8)," Sep. 2010, V8.11.0, 3GPP, Valbonne, France.
"R2-101547—Measurement gap control in CA," 3GPP TSG-RAN WG2 #69, Feb. 22-26, 2010, 3GPP, Valbonne, France.
"R4-102608—Consideration on UE RF capability in CA," 3GPP TSG-RAN WG4 Meeting Ad Hoc 2010 #3, Jun. 28-Jul. 2, 2010, 3GPP, Valbonne, France.

* cited by examiner

METHOD, TERMINAL AND NETWORK DEVICE FOR CONFIGURING MEASUREMENT GAP

CROSS-REFERENCE TO RELATED APPLICATIONS

This application is a continuation of International Patent Application No. PCT/CN2011/075045, filed on May 31, 2011, which claims priority to Chinese Patent Application No. 201010512013.9, filed on Sep. 30, 2010, both of which are hereby incorporated by reference in their entireties.

TECHNICAL FIELD

The present invention relates to mobile communication technologies, and particularly, to a method, terminal and network device for configuring measurement gap.

BACKGROUND

In Long Term Evolution (Long Term Evolution, LTE) network, a terminal needs to adjust a receiver at a different-frequency point when performing a measurement at the different-frequency point of a current serving cell, and adjust the receiver at a working frequency point after performing the measurement. Before adjusting the receiver at the working frequency point of the current serving cell, the terminal cannot receive the data from the current serving cell normally, thus causing the loss of data and the waste of resources. In order to solve such problem, Measurement Gap technology may be adopted. In the Measurement Gap technology, a terminal may report measurement capability information indicating at what frequency point(s) a measurement gap is needed to a base station. Upon receiving the measurement capability information, the base station configures a measurement gap value for the frequency point(s) at which the measurement gap is needed and does not sends data to the terminal at the measurement gap, to avoid the loss of data and the waste of the resources. In LTE, a manner of one report for completing the report of the measurement capability information is adopted. That is to say, the measurement capability information is reported once to a base station, wherein the measurement capability information includes the capabilities, in various scenes, of a terminal.

In order to improve the efficiency of frequency spectrum and users' throughput of mobile communication system, Carrier Aggregation (Carrier Aggregation, CA) technology is introduced to the Long Term Evolution Advanced (Long Term Evolution Advanced, LTE-A) of the Long Term Evolution, wherein the Carrier Aggregation technology means that a user equipment may perform uplink and downlink communication by using multiple component carriers simultaneously, thus supporting data transmission with high speed.

In the prior art, there are at least following problems: in LTE-A to which the CA technology is introduced, there are many working scenes corresponding to a terminal, thus if the manner, in LTE, of one report for completing the report of the measurement capability information is still adopted, it will cause a large amount of signaling overhead.

SUMMARY

The embodiments of the present invention provide a method for configuring measurement gap, terminal and network device, to solve a problem, in the prior art, that the signaling overhead is large and the signaling is wasted when a terminal sends measurement capability information to a base station.

At one aspect, the embodiments of the present invention provide a method for configuring measurement gap, including:

determining an aggregation state of current component carriers, an aggregation state of component carriers which will be configured for a terminal by a network side, or a failure state of a measurement performed by a terminal according to a state of a current measurement configuration;

sending, in the case of the aggregation state of the current component carriers or the failure state of the measurement performed by the terminal according to the state of the current measurement configuration, current measurement capability information of the terminal to the network side, so that the network side performs measurement gap configuration according to the current measurement capability information of the terminal;

sending, in the case of the aggregation state of the component carriers which will be configured for the terminal by the network side, measurement capability information according to the aggregation state of the component carriers which will be configured for the terminal, so that the network side performs measurement gap configuration according to the measurement capability information.

At another aspect, the embodiments of the present invention provide a method for configuring measurement gap, including:

receiving current measurement capability information of a terminal reported, in the case of an aggregation state of current component carriers or a failure state of a measurement performed by a terminal according to a state of a current measurement configuration, by the terminal, or receiving measurement capability information of a terminal reported, in the case of an aggregation state of component carriers which will be configured for the terminal, by the terminal;

performing measurement gap configuration according to the measurement capability information reported by the terminal.

At another aspect, the embodiments of the present invention provide a terminal, including:

a determining module for determining an aggregation state of current component carriers, an aggregation state of component carriers which will be configured for a terminal by a network side, or a failure state of a measurement performed by a terminal according to a state of a current measurement configuration;

a sending module for sending, in the case of the aggregation state of the current component carriers or the failure state of the measurement performed by the terminal according to the state of the current measurement configuration, current measurement capability information of the terminal to the network side, so as for the network side to perform measurement gap configuration according to the current measurement capability information of the terminal, and for sending, in the case of the aggregation state of the component carriers which will be configured for the terminal by the network side, measurement capability information according to the aggregation state of the component carriers which will be configured for the terminal, so as for the network side to perform measurement gap configuration according to the measurement capability information.

At another aspect, the embodiments of the present invention provide a network side, including:

a receiving module for receiving current measurement capability information of a terminal reported, in the case of an aggregation state of current component carriers or a failure state of a measurement performed by a terminal according to a state of a current measurement configuration, by the terminal, or receiving measurement capability information of a terminal reported, in the case of an aggregation state of component carriers which will be configured for the terminal, by the terminal;

a first configuring module for performing measurement gap configuration according to the measurement capability information reported by the terminal.

Based on the above technical solutions, the method, terminal and network side for configuring measurement gap in the embodiments of the present invention, by acquiring the state of current configuration and/or the aggregation configuration state of carriers which will be configured for the terminal by the base station, and sending the network side the measurement capability information under the state of current configuration and/or the aggregation configuration state of carriers which will be configured for the terminal by the base station instead of measurement capability information of all scenes, may reduce the signaling overhead and improve the usage efficiency of signaling.

BRIEF DESCRIPTION OF DRAWINGS

To illustrate the technical solution under the embodiments of the present invention or the prior art more clearly, a brief introduction on the accompanying drawings which are needed in the description of the embodiments or the prior art is given below. Apparently, the accompanying drawings in the description below are merely some of the embodiments of the present invention, based on which other drawings can be acquired by the persons of ordinary skill in the art without any inventive effort.

DESCRIPTION OF EMBODIMENTS

In order to better understand the objectives, solutions and advantages of the embodiments of the present invention, the technical solutions according to the embodiments of the present invention will be described clearly and completely hereinafter with reference to the accompanying drawings in the embodiments of the present invention. Evidently, the described embodiments are merely part, but not all, of the embodiments of the present invention. All other embodiments, which can be derived by the persons of ordinary skills in the art based on the embodiments of the present invention without any inventive efforts, shall fall into the protection scope of the present invention.

Figure 1:
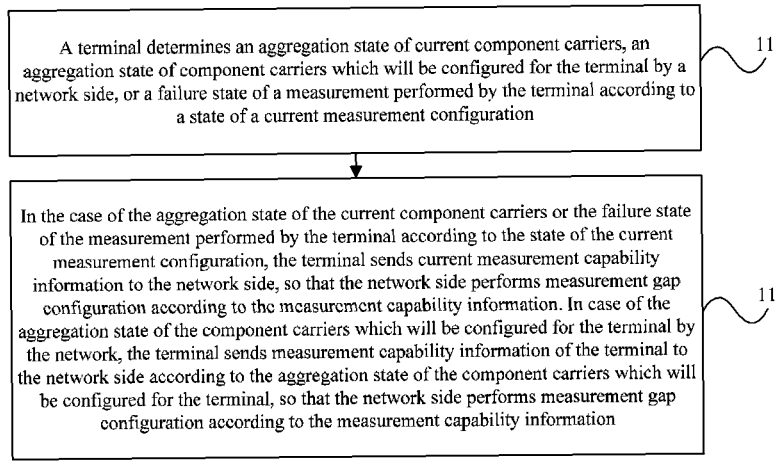
FIG. 1 is a schematic flowchart of a method of a first embodiment according to the present invention.

FIG. 1 is a schematic flowchart of a method of a first embodiment according to the present invention, including:

Step 11. A terminal determines an aggregation state of current component carriers, an aggregation state of component carriers which will be configured for the terminal by a network side, or a failure state of a measurement performed by the terminal according to a state of a current measurement configuration.

Particularly, the terminal may be a User Equipment (User Equipment, UE). Of course, the names of terminals may be different as the systems are different.

The aggregation state of the current component carriers means the state aggregation of component carriers under a current working scene. The aggregation state of the component carriers which will be configured for the terminal by the network side means one or more aggregation scenes in which the terminal may use component carriers.

Further, the aggregation state of the current component carriers may be the aggregation state of the current component carriers, such as an aggregation state of the current component carriers, in which a configuration and activation process of carrier aggregation was adopted, or an aggregation state of the current component carriers, in which a deactivation and deconfiguration process of carrier aggregation was adopted, acquired by the terminal after the base station (e.g., eNodeB) adopts the carrier aggregation technology. The aggregation state of the component carriers, e.g., occupied state of radio frequency link resources, includes what carriers are adopted by the terminal to perform aggregation processing.

Or, the failure state of the measurement performed by the terminal according to the state of the current measurement configuration means that the terminal cannot complete the measurement based on the state of measurement configuration configured by the base station, wherein the state of measurement configuration includes a target frequency point which needs to be measured, measurement gap configuration information and other measurement configuration information.

With regard to the aggregation state of the component carriers which will be configured for the terminal by the network side, it may be that the terminal receives a measurement capability request message sent by the base station, wherein the measurement capability request message may include the aggregation state of the component carriers which will be configured by the base station for the terminal to use and the aggregation state of the component carriers may include at least one of the following items: a frequency band, a frequency band combination, a frequency point and a frequency point combination that can be configured for the terminal to use, and the information of the number of carriers.

Step 12. In the case of the aggregation state of the current component carriers or the failure state of the measurement performed by the terminal according to the state of the current measurement configuration, the terminal sends current measurement capability information to the network side, so that the network side performs measurement gap configuration according to the measurement capability information. In case of the aggregation state of the component carriers which will be configured for the terminal by the network, the terminal sends measurement capability information of the terminal to the network side according to the aggregation state of the component carriers which will be configured for the terminal, so that the network side performs measurement gap configuration according to the measurement capability information.

With regard to the aggregation state of the current component carriers, the corresponding measurement capability information includes at least one of the following items: an identity of a frequency which can be measured (i.e., a frequency band that can be supported), an identity of a frequency point in the frequency band which can be measured, an indication for indicating whether a measurement gap is needed for the frequency band which can be measured, and an indication for indicating whether a measurement gap is needed for a frequency point in the frequency band.

It is to be noted that, if the terminal has already reported the measurement capability information, when the aggregation state of the current carriers changes and the corresponding measurement capability information changes, the above measurement capability information under the aggregation state of the current component carriers is the measurement capability information that has changed. If the measurement capability information does not change, the measurement capability information may need not to be sent again, and the reported measurement capability information may be taken as the measurement capability information under the aggregation state of the current carriers. The reported measurement capability information includes that before the aggregation state of the carriers changes, or that before occupied state of radio frequency link resources changes or that has been reported.

With regard to the failure state of the measurement performed by the terminal according to the state of the current measurement configuration, the corresponding measurement capability information may be at least one of the following items: an identity of a target frequency point which cannot be measured by the terminal in the state of the current measurement configuration, or an identity of a frequency band to which the target frequency point which cannot be measured by the terminal belongs. With regard to the failure state of the measurement performed by the terminal according to the state of the current measurement configuration, the corresponding measurement capability information may be at least one of the following items: an identity of a target frequency point at which the terminal needs a measurement gap in the state of the current measurement configuration, and an identity of a frequency band to which the target frequency point at which the terminal needs a measurement gap belongs.

With regard to the aggregation state of the component carriers which will be configured for the terminal by the network side, it may be that the terminal sends a measurement capability update message to the network side, wherein the measurement capability update message includes measurement capability information corresponding to the aggregation state of the component carriers which will be configured for the terminal, and the measurement capability information corresponding to the aggregation state of the component carriers which will be configured for the terminal may include at least one of the following items: an identity of a frequency band which can be measured by the terminal, an identity of a frequency point in the frequency band which can be measured by the terminal, an indication for indicating whether a measurement gap is needed when a frequency band which can be measured is measured in the aggregation state of the current carriers, and an indication for indicating whether a measurement gap is needed when the frequency point in the frequency band which can be measured is measured in the aggregation state of the current carriers.

In addition, it is to be noted that, in an embodiment of the present invention, the performing measurement gap configuration according to the measurement capability information by the network side may include determining whether to configure a measurement gap, and may also include performing configuration on the type of measurement gap.

In the present embodiment, by acquiring the state of current configuration and/or the aggregation configuration state of carriers which will be configured for the terminal by the base station, and sending the network side the measurement capability information under the state of current configuration and/or the aggregation configuration state of carriers which will be configured for the terminal by the base station instead of the measurement capability information of all scenes, the signaling overhead may be reduced. And the terminal at most works in a scene configured for the terminal to use by the base station, and does not use the measurement capability information of scene(s) that cannot be used by the terminal, while all scenes include scene(s) that cannot be used by the terminal, which causes the signaling waste.

With regard to the aggregation state of the carriers, the terminal may directly report measurement capability information to the network, and may otherwise report measurement capability information upon receiving a measurement capability update request message. Further, the above network side may be an access network, and may otherwise be a core network. Furthermore, with regard to the core network, an access layer message may be adopted, and a non-access layer message may also be adopted.

With regard to the state of measurement configuration, when the terminal cannot measure all target frequency points, the terminal may report a failure message, and may also report a measurement gap request message.

It may be described with regard to the above various scenes respectively. The following embodiments may be described by taking that the terminal is a UE, the entity of the access network is an eNodeB and the entity of the core network is a Mobile Management Entity (Mobile Management Entity, MME) as an example.

Figure 2:
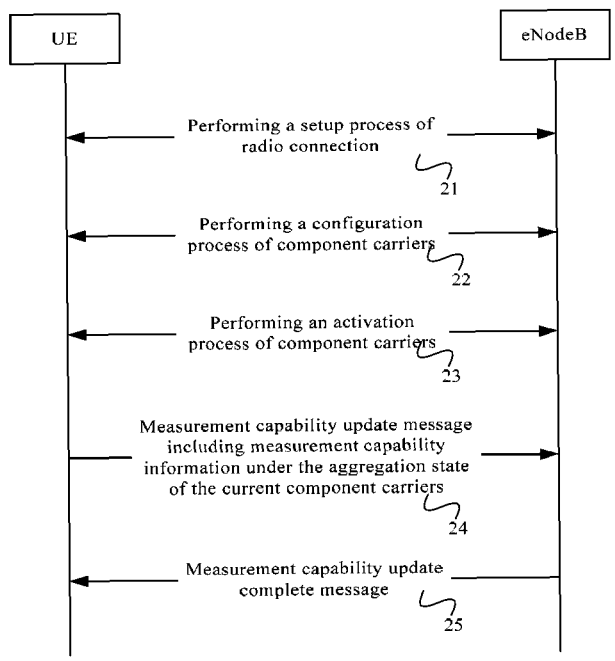
FIG. 2 is a schematic flowchart of a method of a second embodiment according to the present invention.

FIG. 2 is a schematic flowchart of a method of a second embodiment according to the present invention, wherein the present embodiment is described by taking that a UE sends measurement capability information to an eNodeB directly and the aggregation state of current carriers is the state in which a component carrier was activated as an example. As shown in FIG. 2, the present embodiment includes:

Step 21. The UE and the eNodeB perform a setup process of radio connection.

Step 22. The UE and the eNodeB perform a configuration process of component carriers.

Particularly, the eNodeB configures one or more component carriers for the UE and sends information of the configured aggregated carrier(s) to the UE.

Step 23. The UE and the eNodeB perform an activation process of component carriers.

Particularly, the eNodeB activates the one or more configured aggregated carriers and sends information of the activated aggregated carrier(s) and an activation indication to the UE.

By steps 22 to 23, it may makes the UE acquire the aggregation state of the current component carriers on which the component carrier activation was performed.

If the eNodeB actives the component carrier(s) while configuring the component carrier(s), steps 22 to 23 may be combined into one step, which is that the eNodeB performs configuration and activation of the component carrier(s).

In addition, if the eNodeB does not store measurement capability information of the UE before step 22, a report process of measurement capability information may be performed between the UE and the eNodeB, wherein the initial measurement capability information, such as an identity of a frequency band which can be measured under a certain component carrier and/or an indication for indicating whether a measurement gap is needed when a frequency point in the frequency band which can be measured is measured, is reported to the eNodeB by the terminal.

Step 24. The UE reports a measurement capability update message to the eNodeB, wherein the measurement capability update message includes measurement capability information under the aggregation state of the current component carriers and the measurement capability information includes at least one of the following items: an identity of a frequency band which can be measured by the terminal, an identity of a frequency point in the frequency band which can be measured by the terminal, an indication for indicating whether a measurement gap is needed when a frequency band which can be measured is measured, and an indication for indicating whether a measurement gap is needed when a frequency point in the frequency band which can be measured is measured.

If the terminal has already reported measurement capability information and the measurement capability changes through steps 22 to 23, the measurement capability information in the measurement capability update message of step 24 is the updated measurement capability information. If the measurement capability does not change, the measurement capability information that has been reported may be taken as the measurement capability information under the aggregation state of the current carriers. A condition that makes the measurement capability change may be that:

1). If the change occurs before step 22, the condition may be, for example, at least one of the following items: configuration is received and a working frequency point of radio frequency is adjusted, or a new receiver is used.

2). If the change occurs after step 23, the condition may be, for example, at least one of the following items: activation is received and a working frequency point of radio frequency is adjusted, or a new receiver is used.

Step 25. Optionally, the eNodeB returns a measurement capability update complete message to the UE.

In addition, after acquiring the measurement capability information under the aggregation state of the current carriers, the eNodeB may perform measurement configuration according to the measurement capability information. For example, the eNodeB configures a target frequency point which needs to be measured in a frequency band which can be measured by the terminal, and configures a measurement gap value for a frequency point at which a measurement gap is needed, etc.

In the present embodiment, the signaling overhead may be saved and the signaling waste may be avoided as the UE reports, after the component carrier(s) is(are) activated, the measurement capability information under the aggregation state of the current component carriers instead of the measurement capability information of all scenes.

Figure 3:
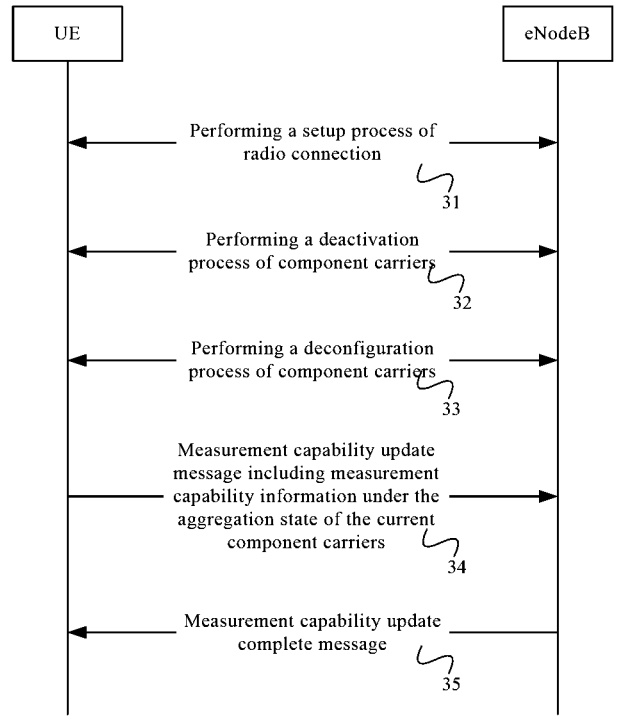
FIG. 3 is a schematic flowchart of a method of a third embodiment according to the present invention.

FIG. 3 is a schematic flowchart of a method of a third embodiment according to the present invention. The present embodiment is described by taking that a UE reports measurement capability information to an eNodeB directly and the aggregation state of the current carriers is the state in which an aggregated carrier was deactivated as an example. As shown in FIG. 3, the present embodiment includes:

Step 31. The UE and the eNodeB perform a setup process of radio connection.

Step 32. The UE and the eNodeB perform a deactivation process of component carriers.

Particularly, the eNodeB deactivates the one or more configured component carriers and sends information of the deactivated component carrier(s) and a deactivation indication to the UE.

Step 33. The UE and the eNodeB perform a deconfiguration process of component carriers.

Particularly, the eNodeB deconfigures one or more component carriers for the UE and sends information of the deconfigured component carrier(s) to the UE.

By steps 32 to 33, it may make the UE acquire the aggregation state of the current component carriers on which the component carrier deactivation was performed. In addition, steps 32 to 33 are not limited by the sequence.

In addition, if the eNodeB deactivates the component carrier(s) while deconfiguring the component carrier(s), steps 32 to 33 may be combined into one step, which is that the eNodeB performs deconfiguration and deactivation of component carrier(s).

In addition, if the eNodeB does not store measurement capability information of the UE before step 32, a report process of measurement capability information needs to be performed between the UE and the eNodeB, wherein the initial measurement capability information, such as an identity of a frequency band which can be measured under a certain carrier and/or an indication for indicating whether a measurement gap is needed when a frequency point in the frequency band which can be measured is measured, is reported to the eNodeB by the UE.

Step 34. The UE reports a measurement capability update message to the eNodeB, wherein the measurement capability update message includes measurement capability information under the aggregation state of the current component carriers, and the measurement capability information includes at least one of the following items: an identity of a frequency band which can be measured by the terminal, an identity of a frequency point in the frequency band which can be measured, an indication for indicating whether a measurement gap is needed when the frequency band which can be measured is measured, and an indication for indicating whether a measurement gap is needed when the frequency point in the frequency band which can be measured is measured.

Similar to step 24, if the measurement capability update message has been reported already and the measurement capability changes through steps 32 to 33, the measurement capability information in the measurement capability update message of step 34 is the updated measurement capability information. If the measurement capability does not change, the measurement capability information that has been reported may be taken as the measurement capability information under the aggregation state of the current carriers. The condition that makes the measurement capability change may be that:

1). If the change occurs after step 32, the condition may be, for example, at least one of the following items: configuration is received and a working frequency point of radio frequency is adjusted, or an idle receiver appears.

2). If the change occurs after step 33, the condition may be, for example, at least one of the following items: configuration is received and a working frequency point of radio frequency is adjusted, an idle receiver appears.

Step 35. Optionally, the eNodeB returns a measurement capability update complete message to the UE.

In addition, after acquiring measurement capability information under the state of current carriers, the eNodeB may perform measurement configuration according to the measurement capability information. For example, the eNodeB configures a target frequency point, at which a measurement needs to be performed, in a frequency band which can be measured by the terminal, and configures a measurement gap value for a frequency point at which a measurement gap is needed, etc.

In the present embodiment, the signaling overhead may be saved and the signaling waste may be avoided as the UE reports, after the component carrier(s) is(are) deactivated, the measurement capability information under the aggregation state of the current component carriers instead of the measurement capability information of all scenes to the eNodeB.

Figure 4:
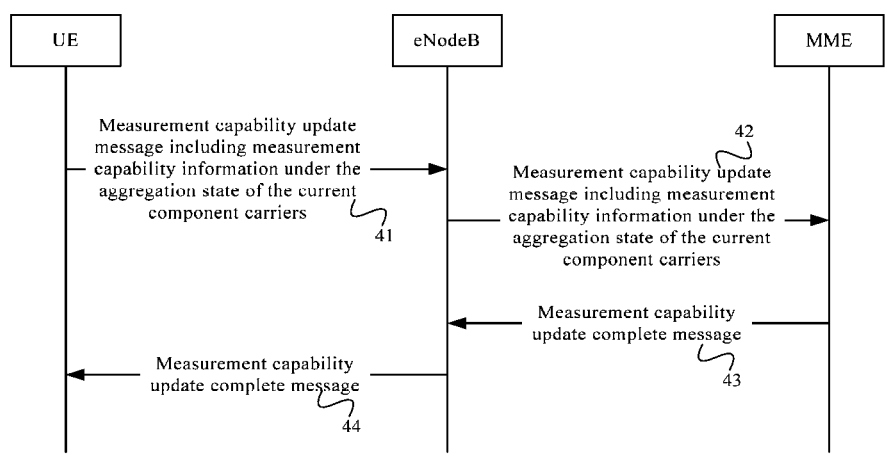
FIG. 4 is a schematic flowchart of a method of a forth embodiment according to the present invention.

FIG. 4 is a schematic flowchart of a method of a fourth embodiment according to the present invention. The present embodiment is described by taking that a UE reports measurement capability information to a MME directly through an eNodeB as an example. As shown in FIG. 4, the present embodiment includes:

Step 41. The UE sends a measurement capability update message to the eNodeB, wherein the measurement capability update message includes measurement capability information under the aggregation state of the current carriers and the measurement capability information includes: an identity of a frequency band which can be measured by the terminal, and/or an indication for indicating whether a measurement gap is needed when a frequency point in the frequency band which can be measured is measured.

The measurement capability update message may be generated by the way shown in FIG. 2 or FIG. 3.

Step 42. The eNodeB sends the measurement capability update message to the MME.

Upon receiving the measurement capability information, the MME may store it.

Step 43. Optionally, the MME returns a measurement capability update complete message to the eNodeB.

Step 44. Optionally, the eNodeB returns the measurement capability update complete message to the UE.

In addition, after acquiring the measurement capability information under the aggregation state of the current component carriers, the eNodeB and/or MME may perform measurement configuration according to the measurement capability information. For example, the eNodeB and/or MME configure/configures a target frequency point, which needs to be measured, in a frequency band which can be measured, and/or configure/configures a measurement gap value for a frequency point at which a measurement gap is needed, etc.

In the present embodiment, the UE sends the measurement capability information to the MME through the eNodeB, namely that the measurement capability information is sent by adopting a message of access layer. The measurement capability information under the aggregation state of the current carriers may also be sent to the MME by adopting a message of non-access layer.

In the present embodiment, the signaling overhead may be saved and the signaling waste may be avoided as the UE reports the measurement capability information under the aggregation state of the current component carriers instead of the measurement capability information of all scenes to the MME directly.

Figure 5:
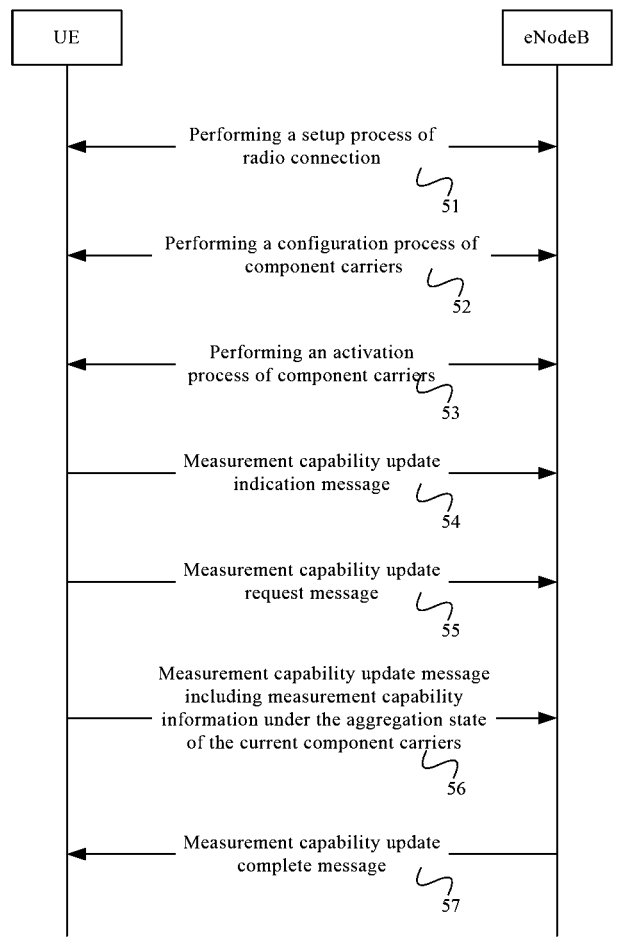
FIG. 5 is a schematic flowchart of a method of a fifth embodiment according to the present invention.

FIG. 5 is a schematic flowchart of a method of a fifth embodiment according to the present invention. The present embodiment is described by taking that a UE indirectly reports the measurement capability information to an eNodeB and the aggregation state of the current carriers is the state in which an aggregated carrier was activated as an example. As shown in FIG. 5, the present embodiment includes:

Step 51. The UE and the eNodeB perform a setup process of radio connection.

Step 52. The UE and the eNodeB perform a configuration process of component carriers.

Particularly, the eNodeB configures one or more component carriers for the UE, and sends information of the configured component carrier(s) to the UE.

Step 53. The UE and the eNodeB perform an activation process of component carriers.

Particularly, the eNodeB activates the one or more configured component carriers, and sends information of the activated component carrier(s) and an activation indication to the UE.

By steps 52 to 53, it may make the UE acquire the aggregation state of the current component carriers on which the component carrier activation was performed.

In addition, if the eNodeB activates the component carrier(s) while configuring the component carrier(s), steps 52 to 53 may be combined into one step, which is that the eNodeB performs configuration and activation of component carrier (s).

In addition, if the eNodeB does not store the measurement capability information of the UE before step 52, a report process of measurement capability information may be performed between the UE and the eNodeB, wherein the initial measurement capability information, such as an identity of a frequency band which can be measured under a certain carrier, and/or an indication for indicating whether a measurement gap is needed when a frequency point in the frequency band which can be measured is measured, is reported to the eNodeB by the UE.

Step 54. The UE sends a measurement capability update indication message to the eNodeB.

If the measurement capability information under the aggregation state of the current component carriers changes, a measurement capability update indication message may be sent. The condition that makes the change may be that shown in step 24.

Step 55. The eNodeB sends a measurement capability update request message to the UE.

Step 56. The UE reports a measurement capability update message to the eNodeB, wherein the measurement capability update message includes measurement capability information under the aggregation state of the current component carriers, and the measurement capability information includes an identity of a frequency band which can be measured by the terminal, and/or an indication for indicating whether a measurement gap is needed when a frequency point in the frequency band which can be measured is measured.

With regard to the specific contents of the step, step 24 may be referred to.

Step 57. Optionally, the eNodeB sends a measurement capability update complete message to the UE.

In addition, after acquiring the measurement capability information under the state of current component carriers, the eNodeB may perform measurement configuration according to the measurement capability information. For example, the eNodeB configures a target frequency point, which needs to be measured, in a frequency band which can be measured, and/or configures a measurement gap value for a frequency point at which a measurement gap is needed, etc.

In the present embodiment, the UE sends a measurement capability update indication message to the eNodeB, then the eNodeB sends a request to the UE. While, the UE may need not to send the measurement capability update indication message, and the eNodeB directly sends a request to the UE. After receiving the measurement capability update request message, if a change occurs, the UE sends the measurement capability information under the aggregation state of the current carriers to the eNodeB.

In the present embodiment, the signaling overhead may be reduced and the signaling waste may be avoided as the UE report, after the component carrier(s) is(are) activated, the measurement capability information under the aggregation state of the current component carriers upon receiving the request of the eNodeB.

Figure 6:
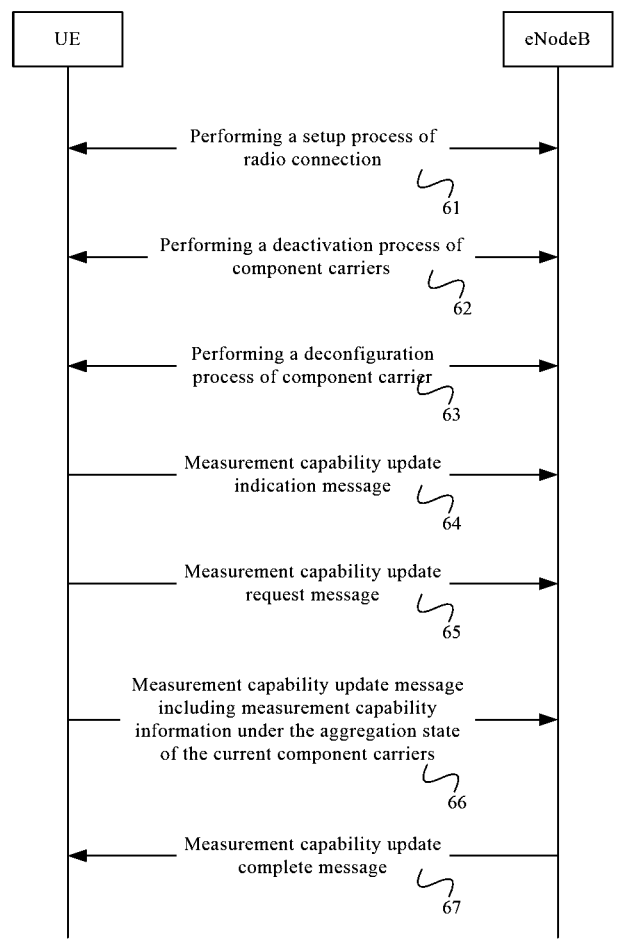
FIG. 6 is a schematic flowchart of a method of a sixth embodiment according to the present invention.

FIG. 6 is a schematic flowchart of a method of a sixth embodiment according to the present invention. The embodiment is described by taking that a UE indirectly reports measurement capability information to an eNodeB and the aggregation state of the current carriers is the state in which an aggregated carrier was deactivated as an example. As shown in FIG. 6, the present embodiment includes:

Step 61. The UE and the eNodeB perform a setup process of radio connection.

Step 62. The UE and the eNodeB perform a deactivation process of component carriers.

Particularly, the eNodeB deactivates the one or more configured component carriers, and sends information of the deactivated component carrier(s) and a deactivation indication to the UE.

Step 63. The UE and the eNodeB perform a deconfiguration process of component carriers.

Particularly, the eNodeB deconfigures one or more component carriers for the UE and sends information of the deconfigured component carrier(s) to the UE.

By steps 62 to 63, it may make the UE acquire the aggregation state of the current carriers on which the aggregated carrier deactivation was performed. The steps 62 to 63 are not limited by the sequence.

In addition, if the eNodeB deactivates the aggregated carrier(s) while deconfiguring the component carrier(s), steps 62 to 63 may be combined into one step, which is that the eNodeB performs deconfiguration and deactivation of the component carrier(s).

In addition, if the eNodeB does not store the measurement capability information of the UE before step 62, a report process of measurement capability information may be performed between the UE and eNodeB, wherein the initial measurement capability information, such as an identity of a frequency band which can be measured under a certain carrier, and/or an indication for indicating whether a measurement gap is needed when a frequency point in the frequency band which can be measured is measured, is reported to the eNodeB by the UE.

Step 64. The UE sends a measurement capability update indication message to the eNodeB.

If the measurement capability information under the aggregation state of the current component carriers changes, a measurement capability update indication message may be sent. The condition that makes the change may be that shown in step 34.

Step 65. The eNodeB sends a measurement capability update request message to the UE.

Step 66. The UE reports a measurement capability update message to the eNodeB, wherein the measurement capability update message includes the measurement capability information under the aggregation state of the current component carriers, and the measurement capability information includes an identity of a frequency band which can be measured by the terminal, and/or an indication for indicating whether a measurement gap is needed when a frequency point in the frequency band which can be measured is measured.

With regard to the specific contents of the step, step 34 may be referred to.

Step 67. Optionally, the eNodeB returns a measurement capability update complete message to the UE.

In addition, after acquiring the measurement capability information under the aggregation state of the current component carriers, the eNodeB may perform measurement configuration according to the measurement capability information. For example, the eNodeB configures a target frequency point, which needs to be measured, in the frequency band which can be measured by the terminal, and/or configures a measurement gap value for a frequency point at which a measurement gap is needed, etc.

In the present embodiment, the UE sends a measurement capability update indication message to the eNodeB, and the eNodeB sends a request to the UE. The UE may need to send the measurement capability update indication message, while the eNodeB directly sends a request to the UE, and upon receiving the measurement capability update request message, the UE sends the measurement capability information under the aggregation state of the current component carriers to the eNodeB if a change occurs.

In the present embodiment, the signaling overhead may be saved and the signaling waste may be avoided as the UE reports, after the component carrier(s) is(are) deactivated, the measurement capability information under the aggregation state of the current component carriers instead of measurement capability information of all scenes upon receiving the request of the eNodeB.

Figure 7:
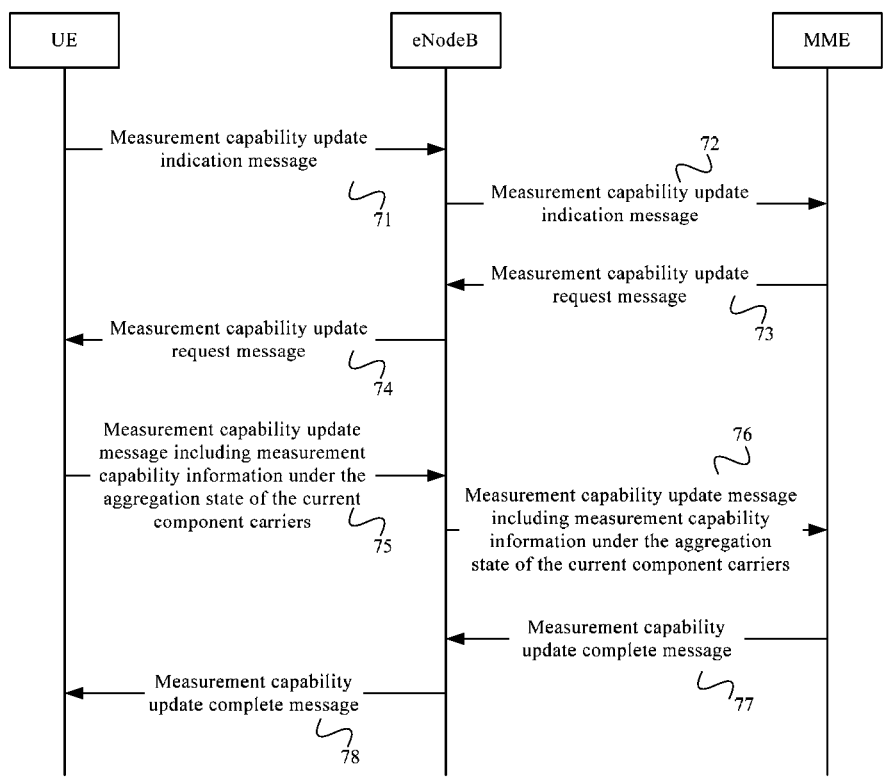
FIG. 7 is a schematic flowchart of a method of a seventh embodiment according to the present invention.

FIG. 7 is a schematic flowchart of a method of a seventh embodiment according to the present invention. The present embodiment is described by taking that a UE reports measurement capability information to MME indirectly through an eNodeB as an example. As shown in FIG. 7, the present embodiment includes:

Step 71. The UE sends a measurement capability update indication message to the eNodeB.

The measurement capability update indication message may be generated by the way shown in FIG. 5 or FIG. 6.

Step 72. The eNodeB sends the measurement capability update indication message to the MME.

Step 73. The MME sends a measurement capability update request message to the eNodeB.

Step 74. The eNodeB sends the measurement capability update request message to the UE.

Step 75. The UE sends a measurement capability update message to the eNodeB, wherein the measurement capability update message includes measurement capability information under the aggregation state of the current component carriers, and the measurement capability information includes at least one of following items: an identity of a frequency band which can be measured by the terminal, an identity of a frequency point in the frequency band which can be measured by the terminal, an indication for indicating whether a measurement gap is needed when the frequency band which can be measured is measured, and an indication for indicating whether a measurement gap is needed when the frequency point in the frequency band which the can be measured.

Step 76. The eNodeB sends the measurement capability update message to the MME.

Upon receiving the measurement capability information, the MME may store it.

Step 77. Optionally, the MME sends a measurement capability update complete message to the eNodeB.

Step 78. Optionally, the eNodeB sends the measurement capability update complete message to the UE.

The signaling interaction between air interfaces and the signaling interaction between the access network and the core network are not limited by the sequence.

In addition, after acquiring the measurement capability information under the state of current component carriers, the eNodeB and/or MME may perform measurement configuration according to the measurement capability information. For example, the eNodeB and/or MME configure/configures a target frequency point, which needs to be measured, in a frequency band which can be measured by the terminal, and/ or configure/configures a measurement gap value for a frequency point at which a measurement gap is needed, etc.

In the present embodiment, the signaling overhead may be saved and the signaling waste may be avoided as the UE reports the measurement capability information under the aggregation state of the current carriers instead of the measurement capability information of all scenes to the MME indirectly.

Figure 8:
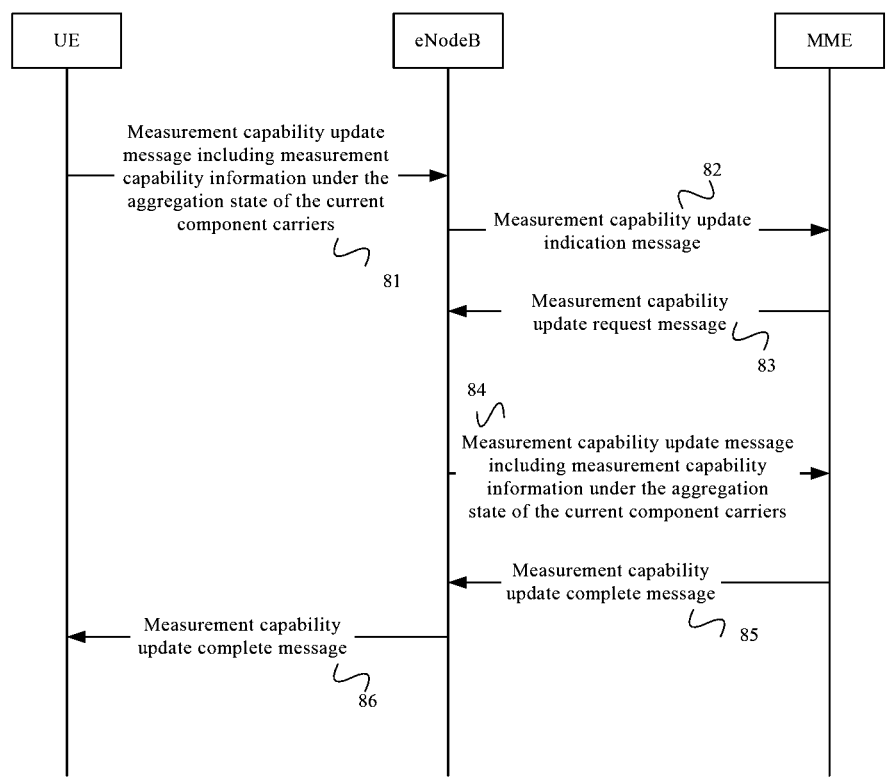
FIG. 8 is a schematic flowchart of a method of an eighth embodiment according to the present invention.

FIG. 8 is a schematic flowchart of a method of an eighth embodiment according to the present invention. The present embodiment is described by taking that a UE reports measurement capability information to a MME indirectly through an eNodeB as an example. As shown in FIG. 8, the present embodiment includes:

Step 81. The UE sends a measurement capability update message to the eNodeB, wherein the measurement capability update message includes measurement capability information under the aggregation state of the current component carriers, and the measurement capability information includes: an identity of a frequency band which can be measured by the terminal, and/or an indication for indicating whether a measurement gap is needed when a frequency point in the frequency band which can be measured is measured.

The measurement capability update message may be generated by the way shown in FIG. 2 or FIG. 3.

Step 82. The eNodeB sends a measurement capability update indication message to the MME.

Step 83. The MME sends a measurement capability update request message to the eNodeB.

Step 84. The eNodeB sends a measurement capability update message to the MME, wherein the measurement capability update message includes measurement capability information under the state aggregation of current component carriers, and the measurement capability information includes: an identity of a frequency band which can be measured, and/or an indication for indicating whether a measurement gap is needed when a frequency point in the frequency band which can be measured is measured.

Upon receiving the measurement capability information, the MME may store it.

Step 85. Optionally, the MME sends a measurement capability update complete message to the eNodeB.

Step 86. Optionally, the eNodeB sends the measurement capability update complete message to the UE.

In addition, after acquiring the measurement capability information under the state of current component carriers, the eNodeB and/or MME may perform measurement configuration according to the measurement capability information. For example, the eNodeB and/or MME may configure a target frequency point, which needs to be measured, in a frequency band which can be measured by the terminal, and/or configure a measurement gap value for a frequency point at which a measurement gap is needed, etc.

In the present embodiment, the measurement capability information is reported indirectly between the access network and the core network, and the measurement capability information is reported directly between the air interfaces. It may be understood that an indirect manner may be adopted between the air interfaces and a direct manner may be adopted between the access network and core network. That is to say, the UE sends a measurement capability update indication message to the eNodeB, and the eNodeB sends a measurement capability update request message to the UE, then the UE sends a measurement capability update message to the eNodeB. While upon receiving the measurement capability update message, the eNodeB forwards it to the MME.

Of course, in the above indirect manner, the UE or eNodeB may do not send the measurement capability update indication message, while the UE sends the measurement capability update message upon receiving the measurement capability update request message sent by the eNodeB or receiving the measurement capability update message sent, after receiving the measurement capability update request message sent by the MME, by the eNodeB.

In the present embodiment, the signaling overhead may be saved and the signaling waste may be avoided as the UE indirectly reports the measurement capability information under the aggregation state of the current component carriers instead of measurement capability information of all scenes to the MME.

The above description is described by taking an access layer message, namely a measurement capability update indication message, a measurement capability update request or a measurement capability update message, between the UE and MME processed by the eNodeB as an example. The following description is described by taking a non-access layer message as an example.

Figure 9:
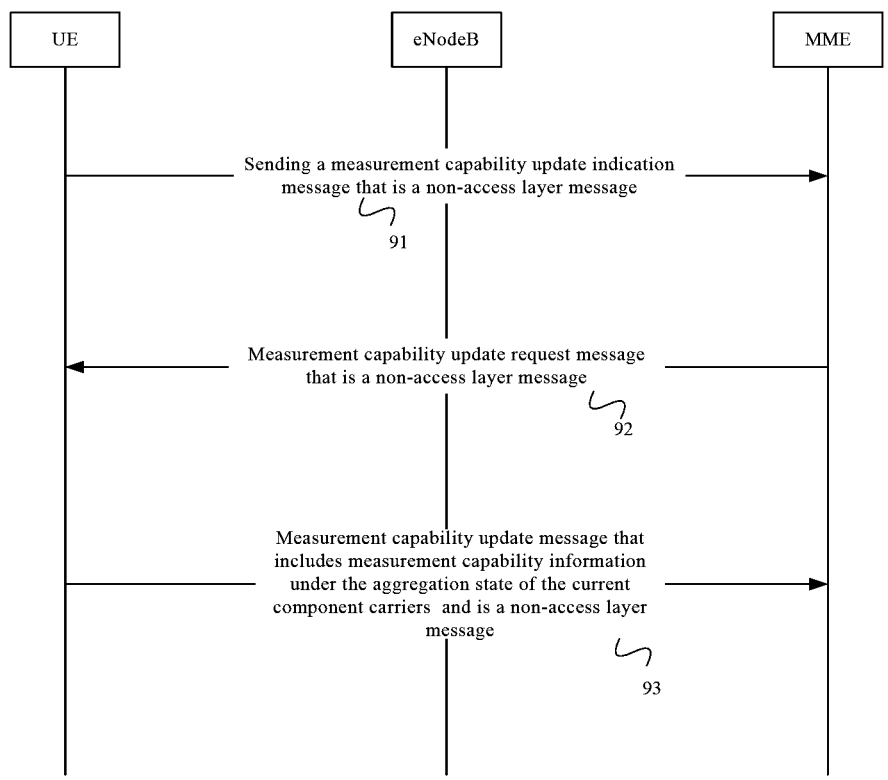
FIG. 9 is a schematic flowchart of a method of a ninth embodiment according to the present invention.

FIG. 9 is a schematic flowchart of a method of a ninth embodiment according to the present invention. The present embodiment is described by taking a non-access layer message carrying measurement capability information as an example.

Step 91. A UE sends a measurement capability update indication message to a MME, wherein the measurement capability update indication message may be a non-access layer message or the measurement capability update indication message may be carried by an existing non-access layer message.

The measurement capability update indication message may be sent after a change occurs to the measurement capability. With regard to the condition that brings a change to the measurement capability, the embodiment shown in FIG. 2 or FIG. 3 may be referred to.

Step 92. The MME sends a measurement capability update request message to the UE, wherein the measurement capability update request message may be a non-access layer message.

Step 93. The UE sends a measurement capability update message to the MME, wherein the measurement capability update message includes measurement capability information under the aggregation state of the current component carriers, and the measurement capability information includes at least one of the following items: an identity of a frequency band which can be measured by the terminal, an identity of a frequency point in the frequency band which can be measured by the terminal, an indication for indicating whether a measurement gap is needed when the frequency band which can be measured is measured, and an indication for indicating whether a measurement gap is needed when the frequency point in the frequency band which can be measured is measured. The measurement capability update message is a non-access layer message.

It may be understood that, in the present embodiment, the UE may also need not to send a measurement capability update indication message. It may be that the MME sends a request, then the UE reports, after the measurement capability changes, the measurement capability information under the aggregation state of the current carriers. Or, the UE may directly report, after the measurement capability changes, measurement capability information under the state aggregation of current carriers without the MME's request.

In addition, after acquiring the measurement capability information under the state of current component carriers, the MME may perform measurement configuration according to the measurement capability information. For example, the MME configures a target frequency point, which needs to be measured, in the frequency band which can be measured, and/or configures a measurement gap value for a frequency point at which a measurement gap is needed, etc.

In the present embodiment, the signaling overhead may be saved and the signaling waste may be avoided as the UE sends the measurement capability information under the aggregation state of the current carriers instead of measurement capability information of all scenes to the MME by adopting a non-access layer message.

The above embodiments relates to the measurement capability update message, measurement capability update request message and measurement capability update indication message, and it may be understood that the above messages may be non-access layer messages or access layer messages, which is not limited by the above embodiments. For example, the measurement capability update message may be a non-access layer message, and the measurement capability update request message may be an access layer message, etc.

FIGS. 2 to 9 are described by taking that the state of current configuration is the aggregation state of the current component carriers as an example, and the following is described by taking the state of the current measurement configuration as an example.

Figure 10:
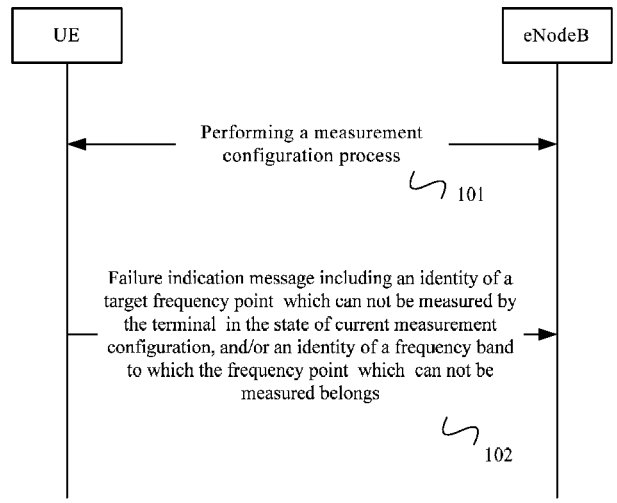
FIG. 10 is a schematic flowchart of a method of a tenth embodiment according to the present invention.

FIG. 10 is a schematic flowchart of a method of a tenth embodiment according to the present invention. The present embodiment is described by taking that a failure message is returned when a measurement cannot be performed as an example. As shown in FIG. 10, the present embodiment includes:

Step 101. A UE and an eNodeB perform a measurement configuration process.

Particularly, the step includes that the eNodeB sends a measurement configuration message to the UE, wherein the measurement configuration message includes information of a target frequency point which needs to be measured and other configuration information.

The UE may acquire the state of the current measurement configuration through the measurement configuration process.

Step 102. The UE sends a failure indication message to the access network when the target frequency point cannot be measured according to the state of the current measurement configuration.

Further, the failure indication message may include the measurement capability information and the measurement capability information may include: an identity of a target frequency point which cannot be measured by the terminal in the state of the current measurement configuration, and/or an identity of a frequency band to which the target frequency point which cannot be measured belongs.

After reporting the failure message, the eNodeB may perform measurement configuration again, and may also configure a measurement gap for a target frequency which cannot be measured, and may also perform the measurement capability update process described as above to acquire the measurement capability information of the UE and to perform measurement configuration.

In the present embodiment, the measurement capability of the UE can be reported in time and performing right configuration by eNodeB can be ensured, by sending, when the measurement cannot be performed, a failure message to indicate the eNodeB to perform reconfiguration. And since the capability information of all scenes needs not to be reported, the signaling overhead may be saved and the signaling waste may be avoided.

Figure 11:
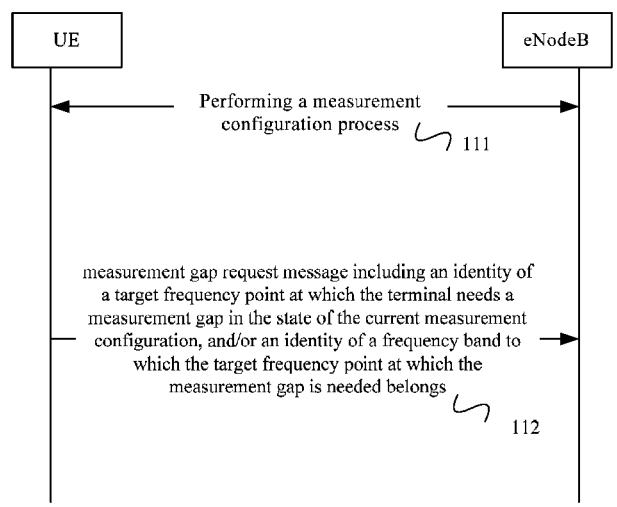
FIG. 11 is a schematic flowchart of a method of an eleventh embodiment according to the present invention.

FIG. 11 is a schematic flowchart of a method of an eleventh embodiment according to the present invention. The embodiment is described by taking that a measurement gap request message is returned when a measurement cannot be performed as an example. As shown in FIG. 11, the present embodiment includes:

Step 111. A UE and an eNodeB perform a measurement configuration process.

Particularly, the eNodeB sends a measurement configuration message to the UE, wherein the measurement configuration message includes information of a target frequency point which needs to be measured and other configuration information.

The state of the current measurement configuration may be acquired through the measurement configuration process.

Step 112. When the UE cannot measure the target frequency point according to the state of the current measurement configuration, the UE sends a measurement gap request message to the access network, wherein the measurement gap request message includes the measurement capability information and the measurement capability information may includes at least one of the following items: an identity of a target frequency point at which the terminal needs a measurement gap, and/or an identity of a frequency band to which the target frequency point at which the measurement gap is needed belongs, and/or an identity of a target frequency band on which a measurement gap is needed, in the state of the current measurement configuration.

After reporting a measurement gap request message, the eNodeB may directly configure a measurement gap for a target frequency point, at which the measurement is needed, according to a stored measurement gap value, and may perform an update process of measurement capability as the above embodiment to acquire the measurement capability information of the UE and to configure a measurement gap for the target frequency point which needs to be measured, according to the acquired measurement capability.

In the present embodiment, the measurement capability of the UE can be reported in time and performing right configuration by eNodeB can be ensured, by sending, when a measurement cannot be performed, a failure message to indicate the eNodeB to perform reconfiguration. And since capability information of all scenes needs not to be reported, the signaling overhead may be saved and the signaling waste may be avoided.

The above embodiment is described by taking the state of current configuration as an example, while it may be that the terminal reports the measurement capability information under the aggregation configuration state of carriers which will be configured.

Figure 12:
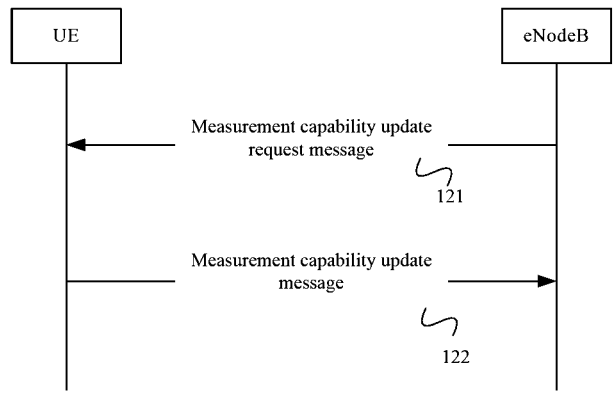
FIG. 12 is a schematic flowchart of a method of a twelfth embodiment according to the present invention.

FIG. 12 is a schematic flowchart of a method of a twelfth embodiment according to the present invention. The present embodiment is described by taking that the aggregation state of carriers which will be configured is acquired as an example. As shown in FIG. 12, the present embodiment includes:

Step 121. An eNodeB sends a measurement capability request message to a UE, wherein the measurement capability request message includes the aggregation state of the component carriers which will be configured by the eNodeB for the terminal to use, and the aggregation state of the component carriers includes at least one of the following items: a frequency band, a frequency band combination, a frequency point and a frequency point combination that can be configured for the terminal to use, and the information of the number of carriers.

Step 122. The UE sends a measurement capability update message to the eNodeB, wherein the measurement capability update message includes measurement capability information corresponding to each aggregation configuration state of carriers which will be configured for the terminal, and the measurement capability information under each aggregation configuration state of carriers which will be configured for the terminal may include at least one of the following items: an identity of a frequency band which can be measured by the terminal, an identity of a frequency point in the frequency band which can be measured by the terminal, an indication for indicating whether a measurement gap is needed when the frequency band which can be measured is measured in the aggregation state of the current carriers, and an indication for indicating whether a measurement gap is needed when the frequency point in the frequency band which can be measured is measured.

Upon receiving the measurement capability information under each aggregation configuration state of carriers which will be configured for the terminal, the eNodeB may perform measurement gap configuration corresponding to each aggregation configuration state of carriers.

In addition, upon receiving the measurement capability update message, the eNodeB may send the measurement capability update message to the MME and the MME performs measurement gap configuration. Or, it may be that the UE may send a measurement capability update message directly to the MME by adopting a non-access layer message. With regard the specific implementation, the process manner under the aggregation configuration state of current carriers may be referred to, which is not described repeatedly.

In the present embodiment, the signaling overhead may be saved and the signaling waste may be avoided by sending the measurement capability information under the aggregation configuration state of carriers which will be configured for the terminal instead of capability information of all scenes.

Figure 13:
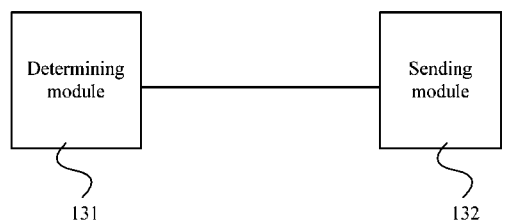
FIG. 13 is a schematic diagram of structure of a terminal of a thirteenth embodiment according to the present invention.

FIG. 13 is a schematic diagram of structure of a terminal of a thirteenth embodiment according to the present invention, including a determining module 131 and a sending module 132. The determining module 131 is used for determining an aggregation state of current component carriers, an aggregation state of component carriers which will be configured for a terminal by a network side, or a failure state of a measurement performed by a terminal according to a state of a current measurement configuration. The sending module 132 is used for sending, in the case of the aggregation state of the current component carriers or the failure state of the measurement performed by the terminal according to the state of the current measurement configuration, current measurement capability information of the terminal to the network side, so as for the network side to perform measurement gap configuration according to the current measurement capability information of the terminal, and for sending, in the case of the aggregation state of the component carriers which will be configured for the terminal by the network side, measurement capability information according to the aggregation state of the component carriers which will be configured for the terminal, so as for the network side to perform measurement gap configuration according to the measurement capability information.

Particularly, the determining module 131 is used for determining the aggregation state of the current component carriers according to a configuration process of component carrier aggregation and/or an activation process of component carriers, or for determining the aggregation state of current component carriers according to a deactivation process of component carrier aggregation and/or a deconfiguration process of component carriers. The sending module 132 is used for sending a measurement capability update message to the network side, wherein the measurement capability update message comprises the measurement capability information and the measurement capability information comprises at least one of the following items: an identity of a frequency band which can be measured by the terminal, an identity of a frequency point in the frequency band which can be measured by the terminal, an indication for indicating whether a measurement gap is needed when the frequency band which can be measured is measured in the aggregation state of the current carriers, and an indication for indicating whether a measurement gap is needed when the frequency point in the frequency band which can be measured is measured in the aggregation state of the current carriers.

Or particularly, the determining module 131 is used for determining the failure state of the measurement performed by the terminal according to the state of the current measurement configuration, and the sending module 132 is used for sending a failure indication message to the network side, when the terminal cannot measure a target frequency point according to the state of the current measurement configuration, wherein the failure indication message comprises current measurement capability information and the measurement capability information comprises at least one of the following items: an identity of a target frequency point which cannot be measured by the terminal, and an identity of a frequency band to which the target frequency which cannot be measured belongs, in the state of the current measurement configuration, or for sending a measurement gap request message to the network side, when the terminal cannot measure a target frequency point according to the state of the current measurement configuration, wherein the measurement gap request message comprises current measurement capability information of the terminal and the current measurement capability information of the terminal comprises at least one of the following items: an identity of a target frequency point at which the terminal needs a measurement gap, an identity of a frequency band to which a target frequency point at which a measurement gap is needed belongs, and an identity of a target frequency band on which a measurement gap is needed, in the state of the current measurement configuration.

Or, the determining module 131 is used for receiving a measurement capability request message sent by the network side, wherein the measurement capability request message comprises the aggregation configuration state of carriers which will be configured for the terminal to use by the network side and the aggregation configuration state of carriers comprises at least one of the following items: a frequency band capable of being configured for the terminal to use, a frequency band combination capable of being configured for the terminal to use, a frequency point capable of being configured for the terminal to use, a frequency point combination capable of being configured for the terminal to use and the information of the number of carriers, and the sending module 132 is used for sending a measurement capability update message to the network side, wherein the measurement capability update message comprises measurement capability information corresponding to the aggregation configuration state of carriers which will be configured for the terminal, and the measurement capability information comprises at least one of the following items: an identity of a frequency band which can be measured by the terminal, an identity of a frequency point in the frequency band which can be measured by the terminal, an indication for indicating whether a measurement gap is needed when the frequency band which can be measured is measured in the aggregation state of the current carriers, and an indication for indicating whether a measurement gap is needed when the frequency point in the frequency band which can be measured is measured in the aggregation state of the current carriers.

In the present embodiment, by acquiring the state of current configuration and/or the aggregation configuration state of carriers which will be configured for the terminal by the base station, and sending the network side the measurement capability information under the state of current configuration and/or the aggregation configuration state of carriers which will be configured for the terminal by the base station instead of measurement capability information of all scenes, the signaling overhead may be reduced and the usage efficiency of signaling may be improved, thus avoiding the signaling waste.

Figure 14:
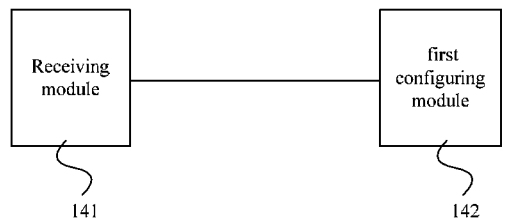
FIG. 14 is a schematic diagram of structure of a network device of a fourteenth embodiment according to the present invention.

FIG. 14 is a schematic diagram of structure of a network device of a fourteen embodiment according to the present invention, the network device including a receiving module 141 and a first configuring module 142. The receiving module 141 is used for receiving current measurement capability information of a terminal reported, in the case of an aggregation state of current component carriers or a failure state of a measurement performed by a terminal according to a state of a current measurement configuration, by the terminal, or receiving measurement capability information of a terminal reported, in the case of an aggregation state of component carriers which will be configured for the terminal, by the terminal. The first configuring module 142 is used for performing measurement gap configuration according to the measurement capability information reported by the terminal.

In the present embodiment, a second configuring module may be included, wherein the second configuring module is used for configuring a component carrier for the terminal. Particularly, the second configuring module is used for configuring the component carrier for the terminal by a configuration process of component carrier aggregation or an activation process of component carriers, or for configuring the component carrier for the terminal by a deactivation process of component carrier aggregation and/or a deconfiguration process of component carriers. Particularly, the receiving module 141 is used for receiving a measurement capability update message sent by the terminal, wherein the measurement capability update message comprises the measurement capability information and the measurement capability information comprises at least one of the following items: an identity of a frequency band which can be measured by the terminal, an identity of a frequency point in the frequency band which can be measured by the terminal, an indication for indicating whether a measurement gap is needed when the frequency band which can be measured is measured in the aggregation state of the current carriers, and an indication for indicating whether a measurement gap is needed when the frequency point in the frequency band which can be measured is measured in the aggregation state of the current carriers.

Or particularly, the receiving module 141 is used for receiving a failure indication message sent, when the terminal cannot measure the target frequency point according to the state of the current measurement configuration, wherein the failure indication message comprises the measurement capability information and the measurement capability information comprises at least one of the following items: an identity of a target frequency point which can be measured by the terminal, and an identity of a frequency band to which the target frequency point which cannot be measured by the terminal, in the state of the current measurement configuration belongs, or for receiving a measurement gap request message sent, when the terminal cannot measurement the target frequency point according to the state of the current measurement configuration, wherein the measurement gap request message comprises the measurement capability information and the measurement capability information comprises at least one of the following items: an identity of a target frequency point at which the terminal needs a measurement gap, an identity of a frequency band to which the frequency point at which a measurement gap is needed belongs, and an identity of a target frequency band on which a measurement gap is needed, in the state of the current measurement configuration.

Or, in the present embodiment, a third configuring module may be included, and the third configuring module is used for sending a measurement capability request message to the terminal, wherein the measurement capability request message comprises the aggregation state of the component carriers which will be configured for the terminal to use and the aggregation state of the component carriers comprises at least one of the following items: a frequency band capable of being configured for the terminal to use, a frequency band combination capable of being configured for the terminal to use, a frequency point capable of being configured for the terminal to use, a frequency point combination capable of being configured for the terminal to use and the information of the number of carriers. Particularly, the receiving module 141 is used for receiving a measurement capability update message sent by the terminal, wherein the measurement capability update message comprises measurement capability information corresponding to the aggregation configuration state of carriers which will be configured for the terminal and the measurement capability information comprises at least one of the following items: an identity of a frequency band which can be measured by the terminal, an identity of a frequency point in the frequency band which cannot be measured by the terminal, an indication for indicating whether a measurement gap is needed when the frequency band which can be measured is measured in the aggregation state of the current carriers, and an indication for indicating whether a measurement gap is needed when the frequency point in the frequency band which can be measured is measured in the aggregation state of the current carriers.

In the present embodiment, by acquiring the state of current configuration and/or the aggregation configuration state of carriers which will be configured for the terminal by the base station, and sending the network side the measurement capability information under the state of current configuration and/or the aggregation configuration state of carriers which will be configured for the terminal by the base station instead of measurement capability information of all scenes, the signaling overhead may be reduced and the usage efficiency of signaling may be improved, thus avoiding the signaling waste.

It should to be understood that the related features of the methods and that of the devices may be mutually referred to. In addition, the "first", "second" and so on are just for distinguishing various embodiments and do not represent metrics and defects of various embodiments.

Those skilled in the art may understand that all of or part of the steps of the method specified in any of the embodiments above may be implemented by a program instructing relevant hardware. The program may be stored in a computer readable storage medium. The program executes the steps of above method embodiments when running. The storage medium may be a ROM, RAM, or a magnetic disk, or an optical disk and other medium which may store the program code.

It should be noticed that the foregoing is merely used for describing the solutions of the present invention, rather than restricting thereof. Although the present invention is described with reference to the above embodiments, the persons of ordinary skills in the art should understand that modifications to the solutions in above embodiments or substitutions to part of technical features therein are possible. Such modifications or substitutions will not make the nature of corresponding solutions depart from the scopes of the solutions of the embodiments of the present invention.

What is claimed is:

1. A method for configuring a measurement gap, wherein the method is implemented by a terminal, and the method comprises:
    determining one of a group consisting of:
        (a) a first aggregation state of current component carriers,
        (b) a second aggregation state of component carriers which will be configured for the terminal by a network side, and
        (c) a failure state of a measurement performed by the terminal according to a state of a current measurement configuration;
    if it is determined to be one of a group consisting of: (a) the first aggregation state of the current component carriers, and (c) the failure state of the measurement performed by the terminal according to the state of the current measurement configuration,
    sending, current measurement capability information of the terminal to the network side, so that the network side performs the measurement gap configuration according to the current measurement capability information of the terminal;
    if it is determined to be (b) the second aggregation state of the component carriers which will be configured for the terminal by the network side,
    sending, measurement capability information under the aggregation configuration state of the component carriers which will be configured for the terminal by the network side, according to the aggregation state of the component carriers which will be configured for the terminal, so that the network side performs the measurement gap configuration according to the measurement capability information.

2. The method according to claim 1, wherein the determining the first aggregation state of the current component carriers further comprises:
    determining the first aggregation state of the current component carriers according to at least one of the following processes: a configuration process of component carrier aggregation, an activation process of the component carriers, a deactivation process of the component carrier aggregation, and a deconfiguration process of the component carriers.

3. The method according to claim 2, wherein the current measurement capability information of the terminal comprises at least one of the following items: an identity of a frequency band which can be measured by the terminal, an identity of a frequency point in the frequency band which can be measured by the terminal, an indication for indicating whether the measurement gap is needed when the frequency band which can be measured is measured in the first aggregation state of the current component carriers, and an indication for indicating whether the measurement gap is needed when the frequency point in the frequency band which can be measured is measured in the first aggregation state of the current component carriers.

4. The method according to claim 3, the method further comprising:
    sending a measurement capability update message comprising the current measurement capability information of the terminal to the network side, when the measurement capability information under the first aggregation state of the current component carriers changes.

5. The method according to claim 3, the method further comprising:
    sending a measurement capability update indication message to the network side, when the measurement capability information under the first aggregation state of the current component carriers changes, so that the network side sends a measurement capability update request message upon receiving the measurement capability update indication message, wherein the measurement capability update request message is used for indicating the terminal to send, upon receiving the measurement capability update request message, a measurement capability update message comprising the current measurement capability information of the terminal to the network side.

6. The method according to claim 3, the method further comprising:
    sending a measurement capability update message comprising the current measurement capability information of the terminal to the network side, when the measurement capability information under the first aggregation state of the current component carriers is different from existed measurement capability information, after receiving a measurement capability update request message sent by the network side.

7. The method according to claim 1, wherein if it is determined to be (c) the failure state of the measurement performed by the terminal according to the state of the current measurement configuration, the sending the current measurement capability information of the terminal to the network side further comprises:
    sending a failure indication message to the network side, when the terminal cannot measure a target frequency point according to the state of the current measurement configuration, wherein the failure indication message comprises the current measurement capability information of the terminal, the current measurement capability information comprises at least one of the following items: an identity of the target frequency point which cannot be measured by the terminal in the state of the current measurement configuration and an identity of a frequency band to which the target frequency point that cannot be measured belongs, in the state of the current measurement configuration.

8. The method according to claim 1, wherein if it is determined to be (c) the failure state of the measurement performed by the terminal according to the state of the current measurement configuration, the sending the current measurement capability information of the terminal to the network side further comprises:
sending a measurement gap request message to the network side, when the terminal cannot measure a target frequency point according to the state of the current measurement configuration, wherein the measurement gap request message comprises the current measurement capability information of the terminal, the current measurement capability information of the terminal comprises at least one of the following items: an identity of the target frequency point at which the terminal needs the measurement gap, in the state of the current measurement configuration, an identity of a frequency band to which the target frequency point at which a measurement is needed belongs, in the state of the current measurement configuration, and an identity of the target frequency band on which the measurement gap is needed, in the state of the current measurement configuration.

9. The method according to claim 1, wherein the second aggregation state of the component carriers which will be configured for the terminal by the network side further comprises at least one of the following items: a frequency band configured for the terminal to use, a frequency band combination configured for the terminal to use, a frequency point configured for the terminal to use, a frequency point combination configured for the terminal to use and information of a number of the component carriers.

10. The method according to claim 1, wherein the sending the measurement capability information under the aggregation configuration state of the component carriers which will be configured for the terminal to the network side further comprises:
sending a measurement capability update message to the network side, wherein the measurement capability update message comprises measurement capability information corresponding to the aggregation configuration state of the component carriers which will be configured for the terminal, and the measurement capability information comprises at least one of the following items: an identity of a frequency band which can be measured by the terminal, an identity of a frequency point in the frequency band which can be measured by the terminal, an indication for indicating whether the measurement gap is needed when the frequency band which can be measured is measured in the first aggregation state of the current component carriers, and an indication for indicating whether the measurement gap is needed when the frequency point in the frequency band which can be measured is measured in the first aggregation state of the current component carriers.

11. A terminal of configuring a measurement gap, comprising:
a processor, configured to determine one of a group consisting of:
(a) a first aggregation state of current component carriers,
(b) a second aggregation state of component carriers which will be configured for the terminal by a network side, and
(c) a failure state of a measurement performed by the terminal according to a state of a current measurement configuration;
a sender, configured to send current measurement capability information of the terminal to the network side, if it is determined to be one of a group consisting of (a) the first aggregation state of the current component carriers, and (c) the failure state of the measurement performed by the terminal according to the state of the current measurement configuration, so that the network side performs the measurement gap configuration according to the current measurement capability information of the terminal, and
the sender is further configured to send, the measurement capability information under aggregation configuration state of the component carriers which will be configured for the terminal according to the aggregation state of the component carriers which will be configured for the terminal, if it is determined to be (b) the second aggregation state of the component carriers which will be configured for the terminal by the network side, so that the network side performs the measurement gap configuration according to the measurement capability information.

12. The terminal according to claim 11, wherein the processor is further configured to determine the first aggregation state of the current component carriers, according to at least one of the following processes: a configuration process of component carrier aggregation, an activation process of the component carriers, a deactivation process of the component carrier aggregation, and a deconfiguration process of the component carriers;
the sender is further configured to send a measurement capability update message to the network side, wherein the measurement capability update message comprises the current measurement capability information of the terminal, and the current measurement capability information comprises at least one of the following items: an identity of a frequency band which can be measured by the terminal, an identity of a frequency point in the frequency band which can be measured by the terminal, an indication for indicating whether the measurement gap is needed when the frequency band which can be measured is measured in the aggregation state of the current carriers, and an indication for indicating whether the measurement gap is needed when the frequency point in the frequency band which can be measured is measured in the aggregation state of the current carriers.

13. The terminal according to claim 11, wherein the processor is further configured to determine the failure state of the measurement performed by the terminal according to the state of the current measurement configuration;
the sender is further configured to implement one of a group consisting of:
(i) sending a failure indication message to the network side, when the terminal cannot measure a target frequency point according to the state of the current measurement configuration, wherein the failure indication message comprises the current measurement capability information of the terminal and the measurement capability information comprises at least one of the following items: an identity of the target frequency point which cannot be measured in the state of the current measurement configuration, and an identity of a frequency band to which the target frequency point which cannot be measured in the state of the current measurement configuration belongs, and (ii) sending a measurement gap request message to the network side, when the terminal cannot measure a target frequency point according to the state of the current measurement configuration, wherein the measurement gap request message comprises the current measurement capability information of the terminal, and the current measurement capability information of the terminal comprises at least one of the following items: an identity of the target frequency point at which the terminal needs the measurement gap in the state of the current measurement configuration, an identity of a frequency band to which the target frequency point at which the measurement gap is needed in the state of the current measurement configuration belongs, and an identity of a target frequency band on which the measurement gap is needed in the state of the current measurement configuration.

14. The terminal according to claim 11, wherein the processor is further configured to receive a measurement capability request message sent by the network side, wherein the measurement capability request message comprises the aggregation configuration state of the component carriers which will be configured for the terminal to use by the network side, and the aggregation configuration state of the component carriers comprises at least one of the following items: a frequency band configured for the terminal to use, a frequency band combination configured for the terminal to use, a frequency point configured for the terminal to use, a frequency point combination configured for the terminal to use and information of a number of the component carriers;

the sender is further configured to send a measurement capability update message to the network side, wherein the measurement capability update message comprises the measurement capability information corresponding to the aggregation configuration state of the component carriers which will be configured for the terminal, and the measurement capability information comprises at least one of the following items: an identity of a frequency band which can be measured by the terminal, an identity of a frequency point in the frequency band which cannot be measured by the terminal, an indication for indicating whether the measurement gap is needed when the frequency band which can be measured is measured in the first aggregation state of the current component carriers, and an indication for indicating whether the measurement gap is needed when the frequency point in the frequency band which can be measured is measured in the first aggregation state of the current component carriers.

15. A network device of configuring a measurement gap, comprising:

a receiver, configured to implement one of a group consisting of:

receiving current measurement capability information of a terminal reported by the terminal, if the network device is in one state of a group consisting of (a) a first aggregation state of current component carriers, and (c) a failure state of a measurement performed by the terminal according to a state of a current measurement configuration, and receiving measurement capability information of the terminal reported by the terminal, if the network device is in (b) a second aggregation state of component carriers which will be configured for the terminal;

a processor, configured to perform the measurement gap configuration according to one of the current measurement capability information and the measurement capability information reported by the terminal.

16. The network device according to claim 15, wherein the processor is further configured to configure a component carrier for the terminal by at least one of the following processes: a configuration process of component carrier aggregation, an activation process of the component carriers, a deactivation process of the component carrier aggregation, and a deconfiguration process of the component carriers.

17. The network device according to claim 15, wherein the receiver is further configured to receive a measurement capability update message sent by the terminal, wherein the measurement capability update message comprises the current measurement capability information, and the current measurement capability information comprises at least one of the following items: an identity of a frequency band which can be measured by the terminal, an identity of a frequency point in the frequency band which can be measured by the terminal, an indication for indicating whether the measurement gap is needed when the frequency band which can be measured is measured in the first aggregation state of the current component carriers, and an indication for indicating whether the measurement gap is needed when the frequency point in the frequency band which can be measured is measured in the first aggregation state of the current component carriers.

18. The network device according to claim 15, wherein the receiver is further configured to implement one of a group consisting of:

(i) receiving a failure indication message sent by the terminal, when a target frequency point cannot be measured according to the state of the current measurement configuration, wherein the failure indication message comprises the current measurement capability information, and the current measurement capability information comprises at least one of the following items: an identity of the target frequency point which cannot be measured by the terminal in the state of the current measurement configuration, and an identity of a frequency band to which the target frequency point which cannot be measured by the terminal in the state of the current measurement configuration belongs, and (ii) receiving a measurement gap request message sent by the terminal when the target frequency point cannot be measured according to the state of the current measurement configuration, wherein the measurement gap request message comprises the current measurement capability information, and the current measurement capability information comprises at least one of the following items: an identity of the target frequency point at which the terminal needs a measurement gap in the state of the current measurement configuration, an identity of a frequency band to which a frequency point at which the measurement gap is needed in the state of the current measurement configuration belongs, and an identity of a target frequency band on which the measurement gap is needed in the state of the current measurement configuration.

19. The network device according to claim 15, wherein the processor is further configured to send a measurement capability request message to the terminal, wherein the measurement capability request message comprises the second aggregation state of the component carriers which will be configured for the terminal to use and the second aggregation state of the component carriers comprises at least one of the following items: a frequency band configured for the terminal to use, a frequency band combination configured for the terminal to use, a frequency point configured for the terminal to use, a frequency point combination configured for the terminal to use and information of a number of the component carriers.

20. The network device according to claim 15, wherein the receiver is further configured to receive a measurement capability update message sent by the terminal, wherein the measurement capability update message comprises measurement capability information corresponding to aggregation configuration state of the component carriers which will be configured for the terminal, and the measurement capability information comprises at least one of the following items: an identity of a frequency band which can be measured by the terminal, an identity of a frequency point in the frequency band which can be measured by the terminal, an indication for indicating whether a measurement gap is needed when the frequency band which can be measured is measured in the first aggregation state of the current component carriers, and an indication for indicating whether the measurement gap is needed when the frequency point in the frequency band which can be measured is measured in the first aggregation state of the current component carriers.

* * * * *